(12) United States Patent
Dragoi et al.

(10) Patent No.: US 7,486,489 B2
(45) Date of Patent: Feb. 3, 2009

(54) SYSTEM AND METHOD FOR SPEED CONTROL AND STALL PROTECTION COMBINATION FOR ELECTRIC MOTORS SUCH AS IN ENGINE COOLING APPLICATIONS

(75) Inventors: Corneliu Dragoi, London (CA); Attila Simofi-Ilyes, London (CA); Andrew Lakerdas, London (CA)

(73) Assignee: Siemens Canada Limited, Chatham (CA)

( * ) Notice: Subject to any disclaimer, the term of this patent is extended or adjusted under 35 U.S.C. 154(b) by 771 days.

(21) Appl. No.: 10/627,903

(22) Filed: Jul. 25, 2003

(65) Prior Publication Data

US 2004/0228051 A1    Nov. 18, 2004

Related U.S. Application Data

(60) Provisional application No. 60/470,090, filed on May 13, 2003.

(51) Int. Cl.
*H02H 5/04* (2006.01)
(52) U.S. Cl. .......................................... 361/23; 361/24
(58) Field of Classification Search .................... 361/23, 361/24; 318/254, 514, 788; 388/852, 856, 388/857
See application file for complete search history.

(56) References Cited

U.S. PATENT DOCUMENTS

| | | | | |
|---|---|---|---|---|
| 3,551,775 A | * | 12/1970 | Safiuddin | 318/434 |
| 3,931,557 A | * | 1/1976 | Osburn | 318/434 |
| 4,205,639 A | | 6/1980 | Kawase et al. | |
| 4,314,186 A | * | 2/1982 | Gille et al. | 318/434 |
| 4,384,312 A | * | 5/1983 | Fry | 361/24 |
| 4,623,826 A | | 11/1986 | Benjamin et al. | |
| 4,683,411 A | | 7/1987 | Hamilton, Jr. et al. | |
| 4,695,779 A | | 9/1987 | Yates | |
| 4,721,083 A | | 1/1988 | Hosaka | |
| 4,725,765 A | * | 2/1988 | Miller | 318/434 |
| 5,012,168 A | | 4/1991 | Dara et al. | |

(Continued)

FOREIGN PATENT DOCUMENTS

JP            3113165            5/1991

(Continued)

OTHER PUBLICATIONS

"DC Motor Adjustable Speed Control Installation and Operating Instructions", Leeson Electric Corporation.

(Continued)

*Primary Examiner*—Brian Sircus
*Assistant Examiner*—Danny Nguyen

(57) ABSTRACT

A speed control and stall protection system 10 for an electric DC brush motor includes a DC brush motor M. At least one relay K3 is connected between the motor and a power supply. A speed sensing circuit 20 is constructed and arranged to generate a signal indicative of a speed of the motor. A motor control and protection circuit 116 is constructed and arranged to receive 1) the signal from the speed sensing circuit and 2) a control signal input for operating the at least one relay to control operation of the motor. When a stall condition is determined based on the signal from the speed sensing circuit, the motor control and protection circuit is constructed and arranged to control the at least one relay to disconnect power to the motor.

8 Claims, 4 Drawing Sheets

U.S. PATENT DOCUMENTS

| | | | |
|---|---|---|---|
| 5,017,846 A * | 5/1991 | Young et al. | 318/244 |
| 5,334,917 A * | 8/1994 | Lind | 318/254 |
| 5,335,307 A | 8/1994 | Sommer | |
| 5,367,236 A * | 11/1994 | Salazar | 318/567 |
| 5,408,164 A | 4/1995 | Oosthuizen | |
| 5,459,661 A | 10/1995 | Yagi et al. | |
| 5,630,009 A | 5/1997 | Hayden | |
| 5,659,452 A | 8/1997 | Blackburn | |
| 5,675,464 A * | 10/1997 | Makaran et al. | 361/23 |
| 5,760,556 A * | 6/1998 | Hamilton et al. | 318/438 |
| 5,761,018 A | 6/1998 | Blakely | |
| 6,034,494 A | 3/2000 | Kitamine et al. | |
| 6,087,791 A | 7/2000 | Maruyama | |
| 6,201,369 B1 | 3/2001 | Johnson | |
| 6,203,293 B1 * | 3/2001 | Yamamoto et al. | 417/423.1 |
| 6,380,641 B2 | 4/2002 | Matsubara et al. | |
| 6,507,164 B1 | 1/2003 | Healey et al. | |
| 6,548,975 B2 | 4/2003 | Kleinau et al. | |
| 6,593,716 B1 * | 7/2003 | Lange et al. | 318/471 |
| 6,940,241 B2 * | 9/2005 | Lange et al. | 318/434 |
| 2002/0088653 A1 | 7/2002 | Takamoto et al. | |

FOREIGN PATENT DOCUMENTS

JP  63297743  12/1998

OTHER PUBLICATIONS

"CET4 Electronic Control and Protection System", Sprecher-Schuh.
Bartos, "Motor Stating and Protection Moves Closer to the Process", Control Engineering Europe, May 1, 1998.

* cited by examiner

SYSTEM AND METHOD FOR SPEED CONTROL AND STALL PROTECTION COMBINATION FOR ELECTRIC MOTORS SUCH AS IN ENGINE COOLING APPLICATIONS

This application is based on U.S. Provisional Application No. 60/470,090, filed on May 13, 2003 and claims the benefit thereof for priority purposes.

FIELD OF THE INVENTION

The invention relates to a system and method of combining speed control and stall protection for dual and single speed electric motor applications. The speed control switching technique uses one or two electromagnetic relays. With the method, the stall protection implementation takes advantage of these relays to disconnect the motor in a stalled motor condition and also provides low speed and current soft start independently from a vehicle computer.

BACKGROUND OF THE INVENTION

A widely used method for implementing a dual speed control for automotive applications using permanent magnet (PM), direct current (DC), brush motors is shown in FIG. 1. The relays K1 and K2 are included in the vehicle electrical system. K1 is used to connect the motor M to the power supply via the serial resistor Rs, for low speed operation. K2 is used to connect the motor directly to the power supply, for high-speed operation. Both relays are fully controlled by the vehicle computer. However, the system of FIG. 1 does not provide stall protection for the motor.

Accordingly, there is a need to provide speed control combined with a stall protection feature, wherein existing relays are employed for both features.

SUMMARY OF THE INVENTION

An object of the invention is to fulfill the need referred to above. In accordance with the principles of the present invention, this objective is achieved by providing a speed control and stall protection system for an electric DC brush motor. The system includes a DC brush motor. At least one relay is connected between the motor and a power supply. A speed sensing circuit is constructed and arranged to generate a signal indicative of a speed of the motor. A motor control and protection circuit is constructed and arranged to receive 1) the signal from the speed sensing circuit and 2) a control signal input for operating the at least one relay to control operation of the motor. When a stall condition is determined based on the signal from the speed sensing circuit, the motor control and protection circuit is constructed and arranged to control the at least one relay to disconnect power to the motor.

In accordance with another aspect of the invention, a method of controlling speed and protecting a motor during a stall condition includes the steps of: providing a permanent magnet DC brush motor; providing at least one relay connected between the motor and a power supply; controlling the at least one relay to operate the motor; determining a speed of the motor, and comparing the determined speed of motor with a threshold value and if the determined speed is below the threshold value, controlling the at least one relay to disconnect power to the motor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

The invention relates to speed control and stall protection for automotive applications using permanent magnet (PM), direct current (DC), brush motors.

Figure 1:
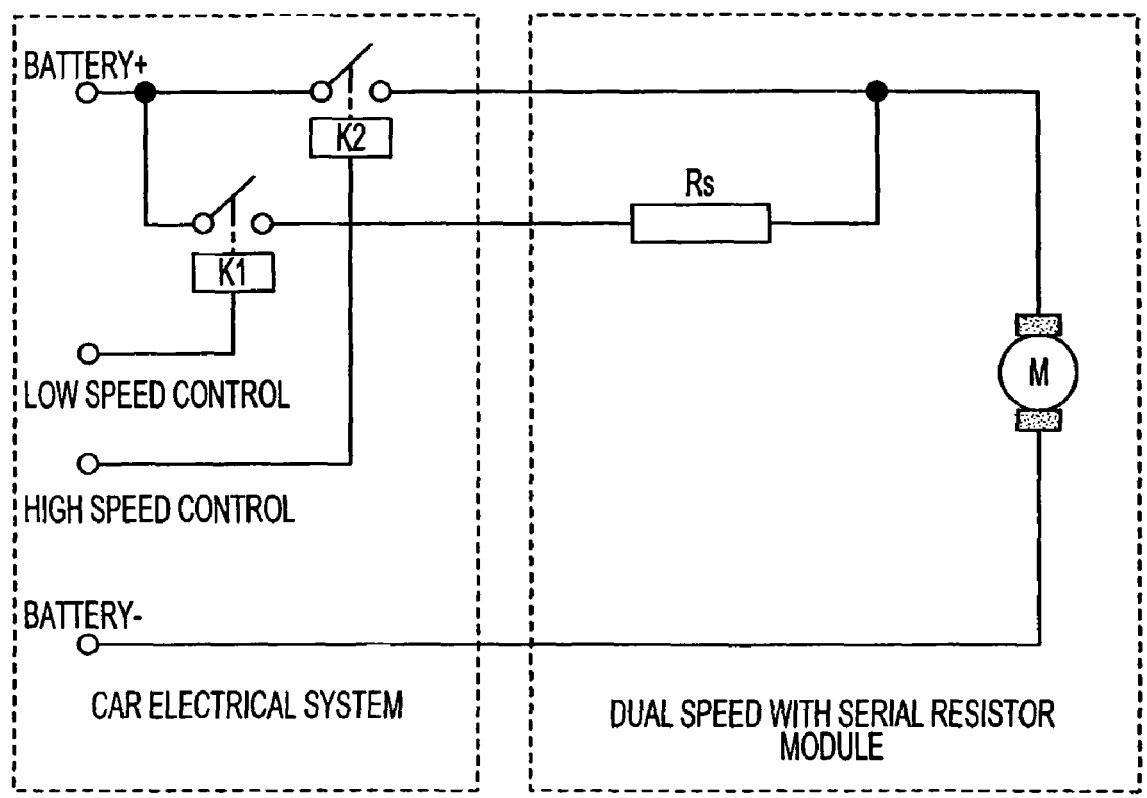
FIG. 1 is a schematic illustration of conventional implementation of dual speed control of an electric motor using two relays.
Figure 2:
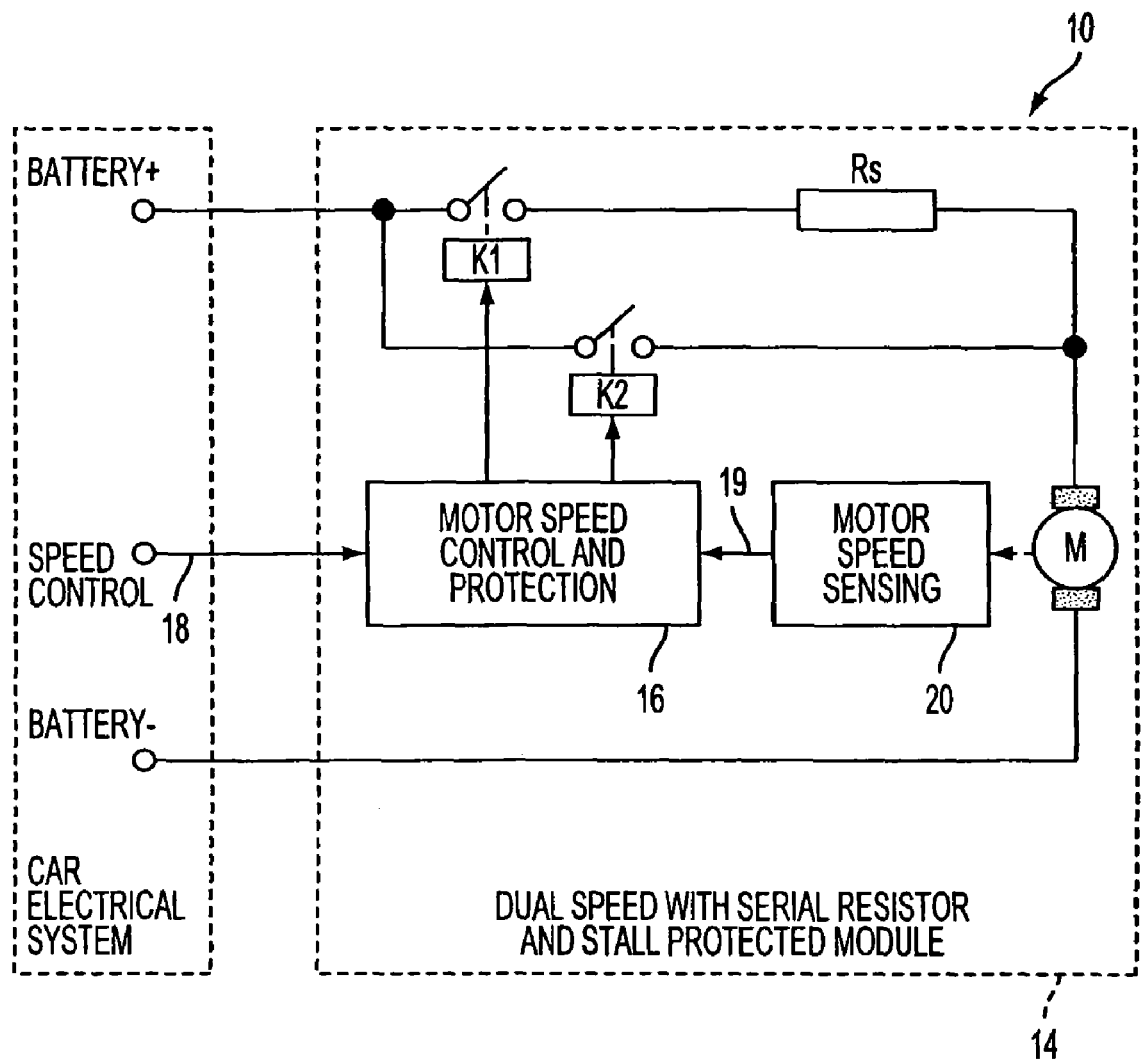
FIG. 2 is schematic illustration of an implementation of dual speed control combined with stall protection in accordance with the principles of the present invention, using the same relays as in FIG. 1.

With reference to FIG. 2, a combined speed control and stall protection system is shown, generally indicated at 10, in accordance with the principles of the present invention. The two relays K1 and K2 are part of the Dual Speed With Serial Resistor And Stall Protection Module electrical system 14. Thus, the motor M is a dual speed motor and the first relay K1 is provided together with series resistor Rs between the power supply and the motor M for operating the motor at a low speed. The second relay K2 is provided between the power supply and the motor M for operating the motor at high speed.

The Motor Speed Control and Protection (MSCP) circuit 16 controls the K1 and K2 relays. The MSCP circuit 16 has two inputs: 1) Speed control signal 18 from the car computer, and 2) Motor speed signal 19 provided by the Motor Speed Sensing circuit 20. The circuit 20 can be of any configuration and can include any device that is capable of determining speed of the brush motor M.

The Speed Control signal 18 governs the functionality of an Application module which can be defined, for example, as any of the following: Engine cooling module or HVAC (Heating, Ventilation and Air conditioning) module. The Speed Control signal 18 has three distinct values representing the three possible commands for the motor: OFF, LOW SPEED and HIGH SPEED. These three commands can be represented by three voltage ranges or by three duty cycles ranges, if a PWM, (Pulse Width Modulation) Speed Control signal is used.

When the motor M is running, a motor speed signal 19 is generated by the Motor Speed Sensing circuit 20 and transmitted to the Motor Speed Control and Protection circuit 16. Whenever the motor's rotational speed is below a minimum setup value (speed threshold) a stall condition is considered to be active. The corresponding motor speed signal is recognized by the Motor Speed Control and Protection circuit 16 and the power supply is disconnected from the motor (K1 OFF and K2 OFF).

Table 1 shows the operation mode and function of the Speed Control command signal and the stall Condition status (active-ON or inactive-OFF).

TABLE 1

| Speed Control | Stall Condition | Relay K1 | Relay K2 |
|---|---|---|---|
| OFF | Any | OFF | OFF |
| Low Speed | OFF | ON | OFF |
| High Speed | OFF | OFF | ON |
| Any | ON | OFF | OFF |

Two start-up sequences are possible corresponding to Low Speed or High Speed value of the Speed Control signal:
- a. Low Speed command: K1 ON, K2 OFF as long as Speed Control signal is Low Speed.
- b. High Speed command: K1 ON, K2 OFF for a short speed build-up time.
  K1 OFF, K2 ON as long as Speed Control signal is High Speed.

It is noted that he Motor Speed Control and Protection circuit 16 represents a generic electronic circuit and can be of any configuration. Furthermore, the Motor Speed Sensing circuit can include a generic transducer.

The advantages of this system 10 are:

A) Implementation of a combined stall protection feature and speed control unit uses already existing/used electromagnetic relays K1 and K2. This provides a better system solution with less cost.

B) The possibility to start the motor with lower inrush current by always starting-up the motor at low speed via the Rs serial resistor. If the car computer requested a motor start-up at high speed, the MSCP 16 would initially command the motor M to run at low speed (motor connected to the power supply (via Rs) and then switch to high speed (motor connected directly to the power supply).

Figure 3:
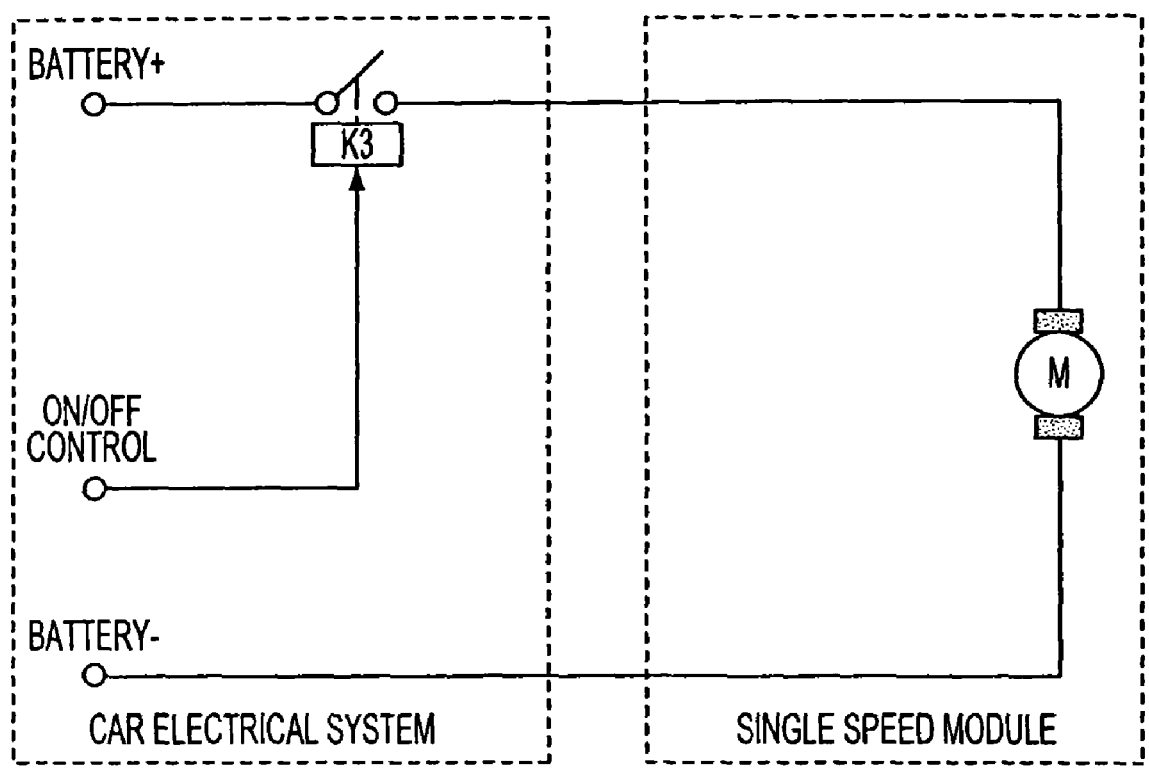
FIG. 3 is a schematic illustration of conventional implementation of single speed control of an electric motor using one relay.
Figure 4:
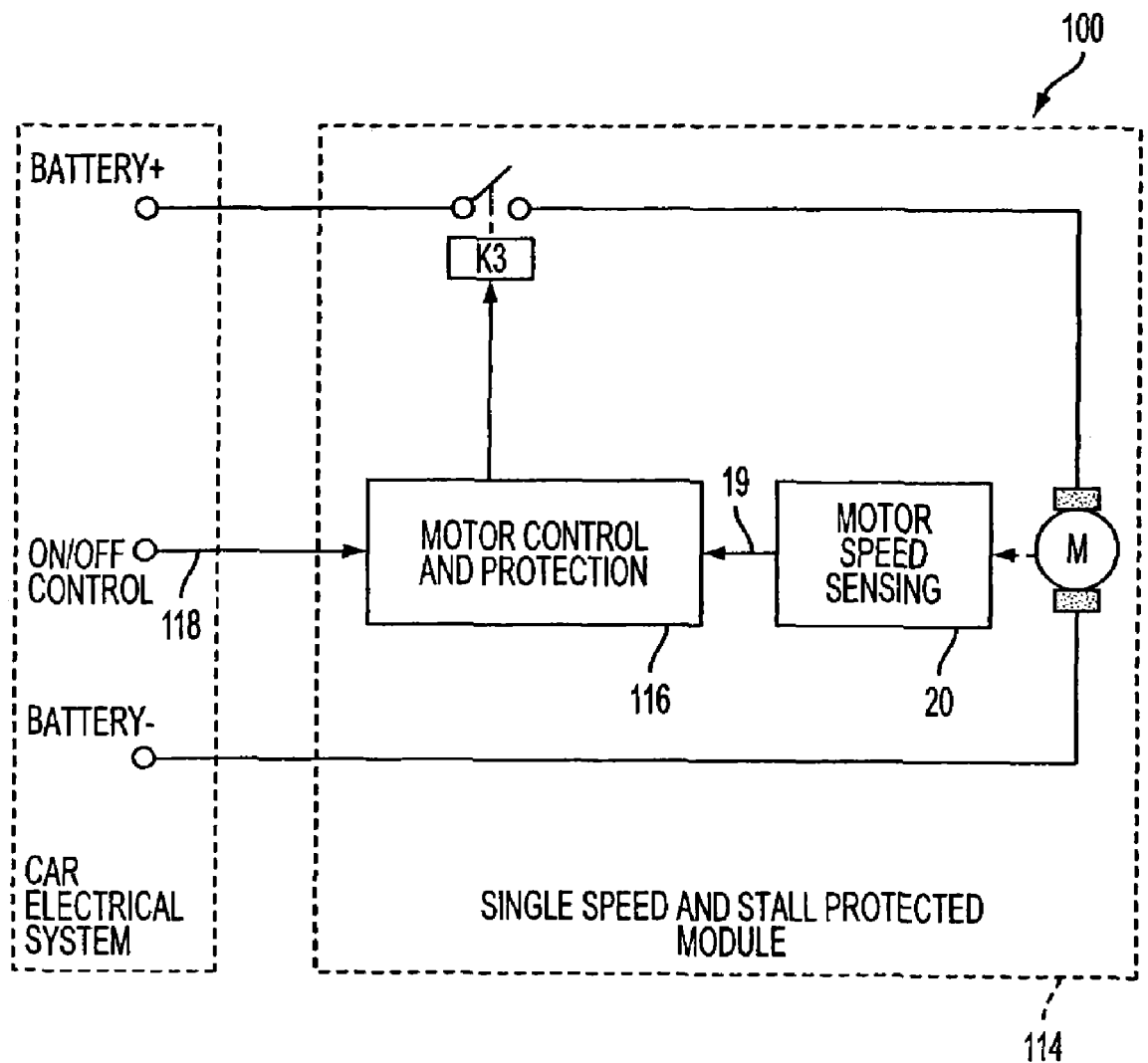
FIG. 4 is schematic illustration of an implementation of single speed control combined with stall protection in accordance with the principles of the present invention, using the same relay as in FIG. 1.

The concept of the invention is also applicable to single-speed motor applications. FIG. 3 shows a conventional configuration widely used for single-speed applications. FIG. 4 shows a combined single speed and stall protected system 100 in accordance with the principles of the invention. Similar to FIG. 2, the electromagnetic relay K3 is included in the Single Speed and Stall Protected Module electrical system 114. The relay K3 is controlled by the Motor Control And Protection (MCP) circuit 116. MCP 116 has also two inputs, an on/off control signal 118 and a motor speed signal 19 provided by the Motor Speed Sensing circuit 20. The circuit 116 functions similarly to that described above with regard to the embodiment of FIG. 2, except that it operates at only one speed.

Features of the illustrated embodiments are:
1. The implementation of the speed control circuitry having the electromagnetic relays within the application module electrical system allowing the control of these relays by the Motor Speed Control and Protection and Motor Control and Protection circuits shown in FIGS. 2 and 4, respectively.
2. Stall protection in combination of any (or all) the following speed control methods: Series Resistor(s), Third brush method and Dual Commutator two-speed system solution.
3. The implementation of the stall protection feature using the electromagnetic relay(s) employed by the speed control circuitry.
4. The start-up sequence used for High Speed command (low speed for a short time followed by high speed) allowing lower inrush motor currents, shown in FIGS. 2 and 4.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

Abbreviations:

| | |
|---|---|
| M | electric motor |
| Rs | serial resistor for low motor speed |
| K1 | electromagnetic relay for low speed operation |
| K2 | electromagnetic relay for high speed operation |
| K3 | electromagnetic relay for motor start/stop |
| PWM | Pulse Width Modulation |
| MCP | Motor Control and Protection |
| MSCP | Motor Speed Control and Protection |
| PM | Permanent Magnet |
| DC | Direct Current |

What is claimed is:

1. A speed control and stall protection system for an electric DC brush motor, the system comprising:

a DC brush motor, at least one relay connected between the motor and a power supply, a speed sensing circuit constructed and arranged to generate a signal indicative of a speed of the motor, and a motor control and protection circuit constructed and arranged to receive 1) the signal from the speed sensing circuit and 2) a control signal input for operating the at least one relay to control operation of the motor, wherein, when a stall condition is determined based on the signal from the speed sensing circuit, the motor control and protection circuit is constructed and arranged to control the at least one relay to disconnect power to the motor, and wherein the motor is a dual speed motor and a first relay is provided together with a series resistor for operating the motor at a low speed and a second relay is provided for operating the motor at a speed greater than the low speed, the motor control and protection circuit being constructed and arranged to receive the control signal input in the form of a speed control signal to selectively activate the first and second relays to control speed of the motor, and to inactivate the first and second relays to disconnect power to the motor.

2. The system of claim 1, wherein the motor, the first and second relays, the speed sensing circuit and the motor control and protection circuit are part of a single module.

3. The system of claim 1, wherein the motor is a permanent magnet motor.

4. A speed control and stall protection system for an electric DC brush motor, the system comprising:

a DC brush motor, at least one relay connected between the motor and a power supply, means for generating a signal indicative of a speed of the motor, and means for controlling speed and protecting the motor constructed and arranged to receive 1) the signal from the speed sensing circuit and 2) a control signal input for operating the at least one relay to control operation of the motor, wherein, when a stall condition is determined based on the signal from the means for generating a signal indicative of a speed of the motor, the means for controlling speed and protecting the motor controls the at least one relay to disconnect power to the motor, and wherein the motor is a dual speed motor and a first relay is provided together with a series resistor for operating the motor at a low speed and a second relay is provided for operating the motor at a speed greater than the low speed, the means for controlling speed and protecting the motor being constructed and arranged to receive the control signal input in the form of a speed control signal to selectively activate the first and second relays to control speed of the motor and to inactivate the first and second relays to disconnect power to the motor.

5. The system of claim 4, wherein the motor, the first and second relays, the means for generating a signal and the means for controlling speed and protecting the motor are part of a single module.

6. A method of controlling speed and protecting during a stall condition, the method including the steps of:

providing a permanent magnet DC brush motor, providing at least one relay connected between the motor and a power supply, controlling the at least one relay to operate the motor, determining a speed of the motor, and comparing the determined speed of motor with a threshold value and if the determined speed is below the threshold value, controlling the at least one relay to disconnect power to the motor, wherein the motor is a dual speed motor and a first relay is provided together with a series resistor for operating the motor at a low speed and a second relay is provided for operating the motor at a speed greater than the low speed, the step of controlling the at least one relay to operate the motor includes selectively activating the first and second relays to control the speed of the motor, and the step of controlling the at least one relay to disconnect power to the motor includes inactivating both the first and second relays.

7. The method of claim 6, wherein to operate the motor at a low speed, the first relay is activated and the second relay is inactivated and to operate the motor at a speed greater than the low speed, the first relay is inactivated and the second relay is activated.

8. The method of claim 6, wherein the step of controlling the at least one relay to control the motor includes operating the motor at the low speed for a certain period of time and then operating the motor at a speed greater than the low speed so as to allow lower inrush of motor currents.

* * * * *